(12) United States Patent
Liu

(10) Patent No.: US 7,929,185 B2
(45) Date of Patent: Apr. 19, 2011

(54) SYSTEM AND METHOD FOR SWITCHING SCREENS FROM OVERVIEW AND PREVIEW

(75) Inventor: Linda Liu, Taichang (TW)

(73) Assignee: Transpacific Systems, LLC, Wilmington, DE (US)

( * ) Notice: Subject to any disclaimer, the term of this patent is extended or adjusted under 35 U.S.C. 154(b) by 1012 days.

(21) Appl. No.: 10/103,834

(22) Filed: Mar. 25, 2002

(65) Prior Publication Data

US 2003/0179422 A1    Sep. 25, 2003

(51) Int. Cl.
    *H04N 1/04* (2006.01)

(52) U.S. Cl. ....... 358/474; 358/1.15; 358/486; 358/501; 358/505; 358/1.2; 396/23; 382/299; 382/276; 382/282; 348/E9.057; 345/592; 345/589

(58) Field of Classification Search ................. 358/474, 358/505, 530, 1.2, 504, 537, 448, 1.18; 396/2, 396/3, 2.3, 23; 382/299, 276, 282; 348/E9.057; 345/592, 589, 694
See application file for complete search history.

(56) References Cited

U.S. PATENT DOCUMENTS

| | | | | |
|---|---|---|---|---|
| 5,726,773 A * | 3/1998 | Mehlo et al. | .................. | 358/474 |
| 5,999,708 A * | 12/1999 | Kajita | ........................... | 358/1.15 |
| 6,035,093 A * | 3/2000 | Kazami et al. | ................... | 386/52 |
| 6,317,560 B1 * | 11/2001 | Kawabata | ......................... | 396/2 |
| 6,330,051 B1 * | 12/2001 | Takanashi | ........................ | 355/40 |
| 6,453,078 B2 * | 9/2002 | Bubie et al. | ..................... | 382/305 |
| 6,466,302 B1 * | 10/2002 | Rousseau et al. | ................ | 355/61 |
| 6,628,422 B2 * | 9/2003 | Ouchi | ............................. | 358/1.6 |
| 6,693,650 B2 * | 2/2004 | Wakashiro et al. | ........... | 715/788 |
| 6,744,529 B2 * | 6/2004 | Winter et al. | ................. | 358/1.15 |
| 6,775,022 B2 * | 8/2004 | Noyes et al. | .................... | 358/1.15 |
| 6,940,526 B2 * | 9/2005 | Noda et al. | ..................... | 345/629 |
| 6,954,282 B2 * | 10/2005 | Miyamoto et al. | ........... | 358/1.18 |
| 6,967,728 B1 * | 11/2005 | Vidyanand | .................... | 358/1.12 |
| 6,995,875 B2 * | 2/2006 | Dow et al. | ...................... | 358/473 |
| 7,010,176 B2 * | 3/2006 | Kusunoki | ....................... | 382/299 |
| 7,038,717 B2 * | 5/2006 | Dow et al. | .................... | 348/231.3 |
| 7,124,359 B2 * | 10/2006 | Suzuki et al. | .................. | 715/517 |
| 7,133,597 B2 * | 11/2006 | Tingey et al. | ................... | 386/96 |
| 7,215,439 B2 * | 5/2007 | Suzuki | .......................... | 358/1.18 |
| 7,349,577 B2 * | 3/2008 | Kaneda et al. | ................. | 382/190 |
| 7,369,263 B2 * | 5/2008 | Azami | .......................... | 358/1.16 |
| 7,466,441 B2 * | 12/2008 | Barry et al. | ................... | 358/1.15 |
| 7,583,405 B2 * | 9/2009 | Harrington et al. | ............ | 358/1.9 |
| 2001/0006425 A1 * | 7/2001 | Takamori et al. | .............. | 358/530 |
| 2002/0030634 A1 * | 3/2002 | Noda et al. | .......................... | 345/5 |
| 2002/0075529 A1 * | 6/2002 | Sato et al. | ...................... | 358/505 |
| 2002/0154343 A1 * | 10/2002 | Chiu et al. | ..................... | 358/474 |
| 2007/0008558 A1 * | 1/2007 | Rumph et al. | .................. | 358/1.9 |

(Continued)

*Primary Examiner* — Negussie Worku

(74) *Attorney, Agent, or Firm* — Stolowitz Ford Cowger LLP

(57) ABSTRACT

The invention is to provide a system and method for switching screens from overview and preview. The method comprises multitudes of overviewed jobs that are selected on an overview zone for the objective image. Multitudes of selected jobs are displayed on a select preview zone for the overview zone. Multitudes of selected jobs are generated for the select job pictures. The corresponding previewed settings are added to the corresponding previewed settings. The system comprises an overview module for displaying a previewed digital picture. Set modules is for selecting and edit settings for several jobs on the previewed digital picture. A preview module is for storing several selected jobs on the set module and displaying several select jobs respectively on the preview module.

46 Claims, 4 Drawing Sheets

U.S. PATENT DOCUMENTS

2007/0041057 A1* 2/2007 Chen .............................. 358/474
2008/0186325 A1* 8/2008 Higgins et al. ................ 345/592
2008/0252944 A1* 10/2008 Otsuka .......................... 358/474
2009/0195819 A1* 8/2009 Sugimoto et al. ............ 358/1.15

* cited by examiner

SYSTEM AND METHOD FOR SWITCHING SCREENS FROM OVERVIEW AND PREVIEW

BACKGROUND OF THE INVENTION

1. Field of the Invention

The present invention generally relates to a system and method for capturing images, and more particularly to the system and method for switching screens from overview and preview.

2. Description of the Prior Art

In recent years, a digital copying machine has had various functions for processing a document image, such as black-and-white inversion, mirroring, inside-blanking, or image separation. In addition, a color digital copying machine also has other color processing functions, such as color conversion or color deletion. Users select a desired image area or any one of the functions described above for a particular image on an operating zone or with an editor to set conditions for image processing. In this case, users generally output a trial copy to check whether a desired image quality can be obtained or not, and then enables the user to execute fine adjustments. In a case where a desired image quality has not been obtained, and again outputs a trial copy to check the quality of the outputted copy. A scanner is a device that converts a visible image such as a photograph, transparency or printed paper into an electronic form suitable for copying, storing or processing by a computer.

The scanning procedure proposed in the prior art comprises basic steps described as steps 11-15 shown in FIG. 1, first scan an original with lower resolution 11, then the first image is displayed on a preview screen 12. User selects a portion of the first image from the preview screen 13. Then scans the corresponding original image with a higher resolution to get a second image 14, and output the second image 15.

Due to the resolution of first scan being lower than the second scan, the first image displayed on the preview screen is usually different than the second image. Though an image is not obviously distorted by variation of resolution, the nature of the image, such as color, brightness, spot, and edge of profile, is usually varied with the resolution resulting in the difference between the selected first image shown on the preview screen and the output image (such as a printed picture or saved file).

In the prior art for scanners, a picture is placed on a scanner screen. The scanner scans the picture and stores the resulting image in a computer memory. The image may then be displayed upon a monitor. The conventional scanners usually provide a preview function that can quickly scan a picture in low resolution to generate a preview image. A user can then specify one or more scanning areas/target areas on the preview image to instruct the scanner to scan only the designated areas. The scanner will later scan the designated areas in high resolution and transmit only the images from the designated areas back to a computer. In accordance with the operation of the conventional scanners, after the preview image is displayed, a normal scan of a portion of the picture that corresponds to the designated area is then performed. However, the scanner is on standby during this period of time to specify the scanning areas/target areas of the preview image. The scanner user interface (UI) for switching screen of overview and preview isn't an intuitive method. It isn't possible to preview many frames at the same time.

In view of the prior art described, it is a desire to provide a system and method for switching screens from overview and preview.

SUMMARY OF THE INVENTION

In accordance with the present invention, the system and method for switching screens from overview and preview so that a user can switch screens from overview and preview at the same time.

One object of the present invention is to provide the system and method for switching screens from overview and preview so that a user can frame many jobs to preview action in the overview image.

Another object of the present invention is to provide the system and method for switching screens from overview and preview to increase resolution in the preview image.

Further object of the present invention is to provide the system and method for switching screens from overview and preview that each of the framed jobs can preview scan alone or all the frame jobs can preview scan once.

In order to achieve the above object, the present invention provides a system and method for switching screens from overview and preview. The method comprises multitudes of overviewed jobs that are selected on an overview zone for the objective image. Multitudes of select jobs are displayed on a select preview zone for the overview zone. Multitudes of selected jobs are generated for the selected jobs pictures. The corresponding previewed settings are added to the corresponding previewed settings. The system comprises an overview module for displaying a previewed digital picture for an objective image. Set modules is for selecting and edit settings of several jobs on the previewed digital picture. A preview module is for storing several selected jobs on the set module and displaying several selected jobs respectively on the preview module.

BRIEF DESCRIPTION OF THE DRAWINGS

The foregoing aspects and many of the attendant advantages of this invention will become more readily appreciated as the same becomes better understood by referring to the following detailed description, when taken in conjunction with the accompanying drawings, wherein.

DESCRIPTION OF THE PREFERRED EMBODIMENT

While the invention is described in terms of a single preferred embodiment, those skilled in the art will recognize that many steps described below can be altered without departing from the spirit and scope of the invention.

Furthermore, there is shown a representative portion of display interface of the present invention in enlarged. The drawings are not necessarily to scale to clarify the illustration and should not be interpreted in a limiting sense. Accordingly, these regions will have other conventionally functional zones, when viewed in an actual application.

In the present invention, a method and a system of display interface for an image copy machine is disclosed. The method comprises multitudes of overviewed jobs that are selected on an overview zone for the objective image. Multitudes of select jobs are displayed on a select preview zone for the overview zone. Multitudes of selected jobs are generated for the selected jobs pictures. The corresponding previewed settings are added to the corresponding previewed settings. The system comprises an overview module for displaying a previewed digital picture. Set modules is for selecting and edit settings of several jobs on the previewed digital picture. A preview module is for storing several selected jobs on the set module and displaying several selected jobs respectively on the preview module.

Figure 1:
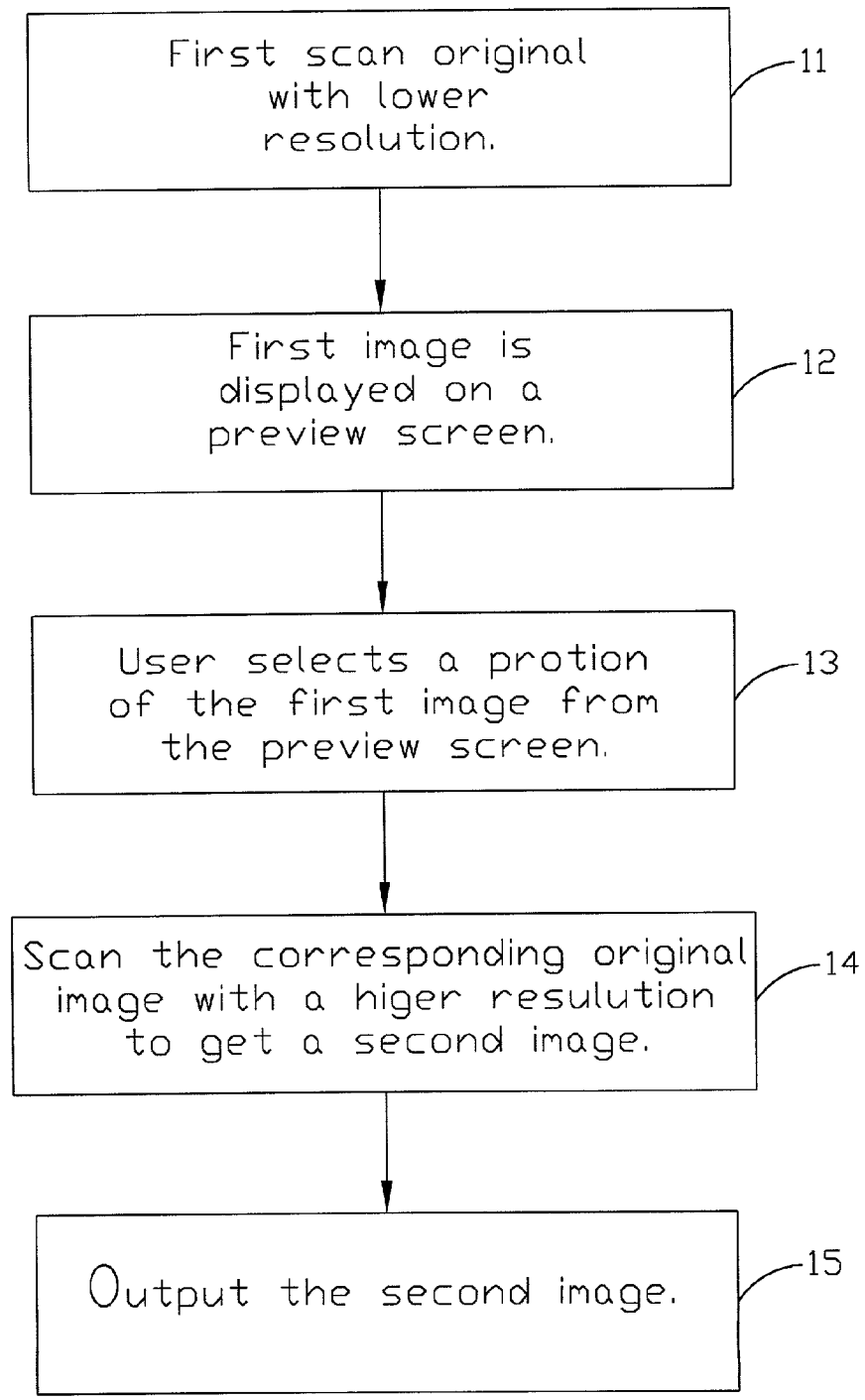
FIG. 1 is diagram of scanning procedure in the prior art.
Figure 2:
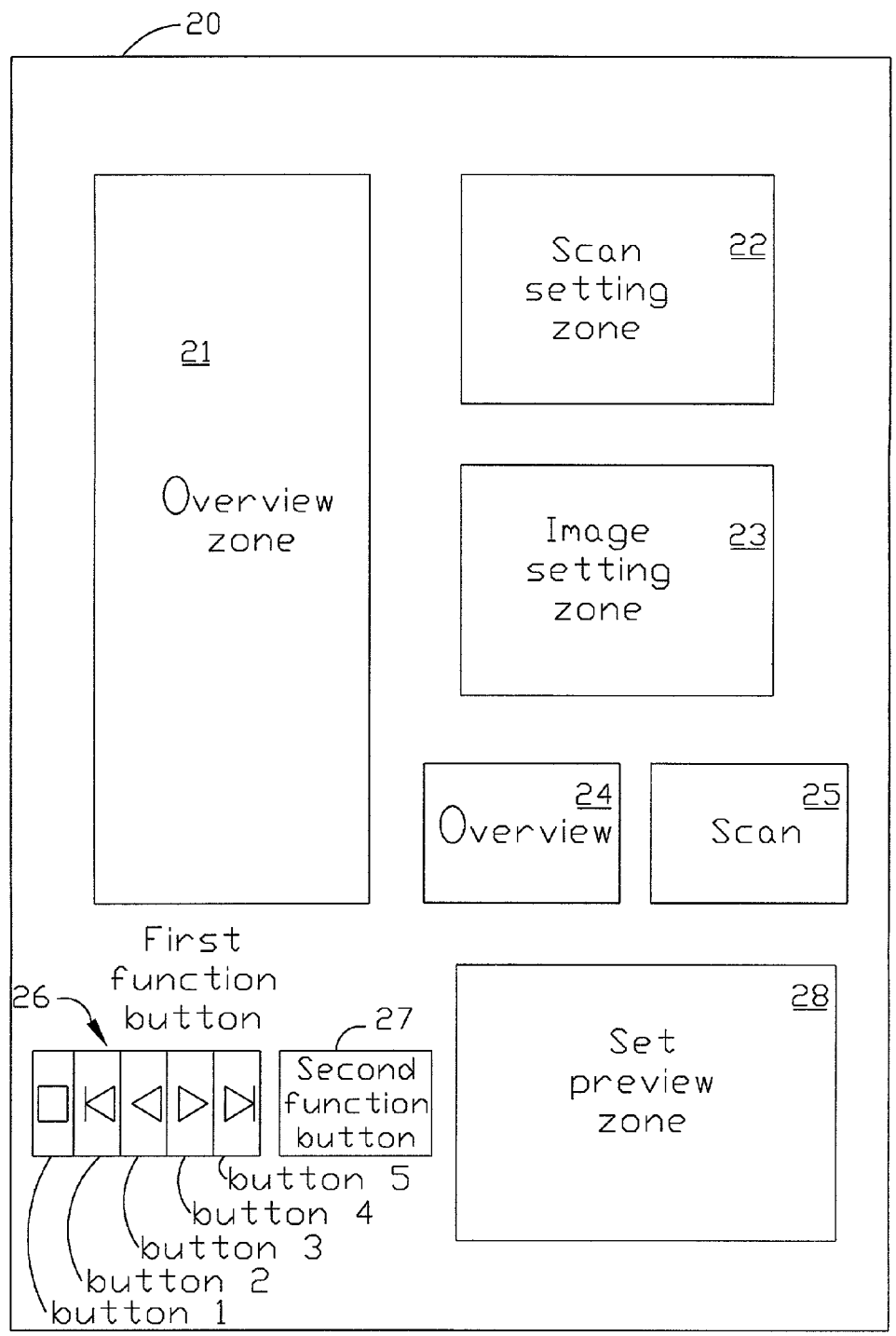
FIG. 2 is a schematic diagram illustrating a display screen providing users overviewing, previewing, select previewing, setting, and scanning an objective digital image in accordance with the present invention.

As depicted in FIG. 2, when users would like to capture the digital picture of objective image, a dialog box 20 is displayed in the operation interface of an image processing software. The dialog box generally comprises an overview zone 21, a setting scan zone 22, a setting image zone 23, an overview button 24, a scanning button 25, a first function button 26, a second function button 26, and a select preview zone 28 in addition. The objective digital picture can be previewed in the overview zone 21 and configured with several functional settings, such as scan result, in the setting scan zone 22. The objective digital picture can be previewed in the overview zone 21 and configured with several functional settings, such as resolution, miniature and magnification ratio, source image size, or objective image size, in the setting image zone 23. The overview button 24 provides users with a captured and previewed digital picture that is shown in the overview zone 21. In one embodiment, the scan steps can omit the preview step. After the overview preview scan, the generated image may serve as a preview image. The job that is displayed in the select preview zone 28 may be previewed once in the overview preview image in order to differentiate whether the job is selected correctly.

In addition, there are several pictures with various configurations shown in the select preview zone 28 when the overview image is selected for a multitude of jobs. The image is selected on the overview zone 21. A plurality of selected jobs are shown by using a first button 26. The first functional button 26 comprises button 1, button 2, button 3, button 4, and button 5. Button 1 typifies "back to the overview image". Button 2 typifies "jump to the first job". Button 3 typifies "jump to the previous job" wherein, in one embodiment, the present job is displayed on the overview screen and the previous job is displayed on the preview screen. Button 4 typifies "jump to the next job" wherein, in one embodiment, the present job is displayed on the overview screen and the next job is displayed on the preview screen. ". Button 5 typifies "jump to the lastjob". Button 1 to button 5 can choose the selected job, such as job1, job2, job3 . . . and so on, on the first functional button 26. To push down button 2 to button 5 can determine whether a preview scan is needed or whether to regulate the job or not. The job will proceed without the preview scan and display the image if the job doesn't request a preview scan. The second functional button 27 can input a job number to show the selected job immediately, such as job 1, job2, job3 . . . and so on.

Figure 3:
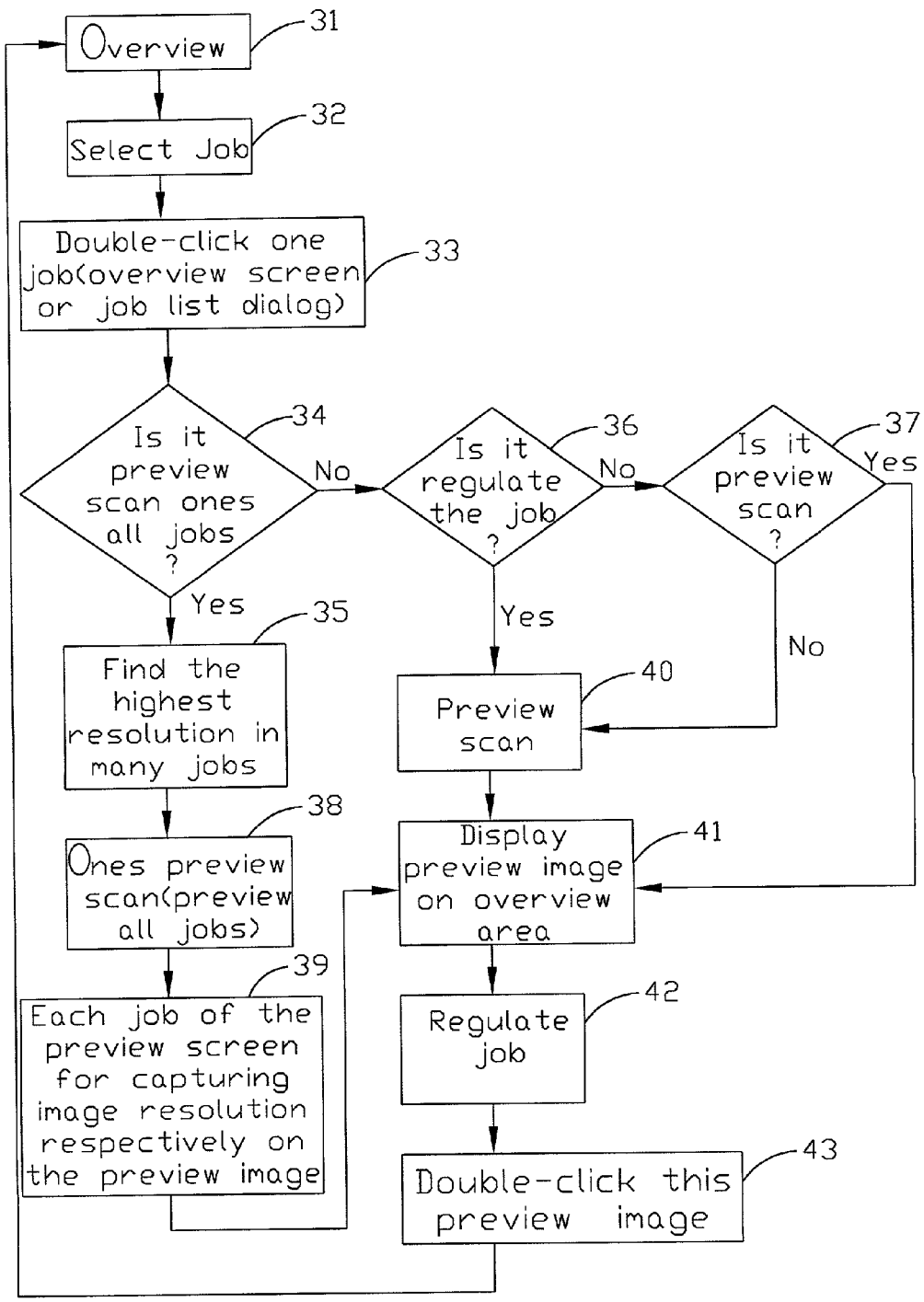
FIG. 3 is a schematic diagram illustrating the system of the interface operation in accordance with the present invention.

FIG. 3 shows a systemic diagram illustrating the system of the operation interface in accordance with the present invention. Block diagram 31 of an overview illustrates displaying the previewed pictures in the operation interface. Block diagram 32 illustrates selecting a scanned job on the overview image. The selected job comprises multitudes of selected jobs, or may not have any selected jobs on the overview zone. Block diagram 33 illustrates selecting (e.g. double-click) one of the selected jobs or job list dialog on the overview zone. Block diagram 34 determines if all jobs are preview scanned once or not. All jobs are previewed and scanned once. Then, block diagram 35 finds the highest resolution in from the job. Next, block diagram 38 illustrates previewing each job of the preview screen. Each job is a captured image on the preview image. Block diagram 39 illustrates, for each job of the preview screen, capturing image resolution respectively on the previewed image. Block diagram 41 displays the preview image on the overview zone. Block diagram 42 is a regulating job. Block diagram 43 illustrates selecting, e.g. double-click, the preview image. Then, the overview image comes back to an original image at step 31 when the preview image is double-clicked again.

All jobs are previewed and scanned respectively. Block diagram 36 determines whether or not to regulate a job or not. All jobs perform a preview scan if the jobs need to be regulated. Block diagram 40 is a preview scan in connection with job resolution. Block diagram 41 is a displayed preview image on the overview zone. Block diagram 42 is a regulating job. Block diagram 43 is a double-clicked preview image. Then, the overview image can come back to an original image when the preview image is double-clicked again.

All jobs don't regulate the previewed scan (such as size, resolution). Block 37 determines if the preview scan is needed or not. Block diagram 41 is a displayed preview image on the overview zone. Block diagram 42 is a regulating job. Block diagram 43 is a double-clicked preview image. Then, the job isn't preview scanned and displayed before all jobs are previewed scan. Block diagram 40 is a preview scan in connection with the job resolution. Block diagram 41 is a displayed preview image on the overview zone. Block diagram 42 is a regulating job. Block diagram 43 is a double-clicked preview image. Then, the overview image can come back to an original image when the preview image is double-clicked again.

Figure 4:
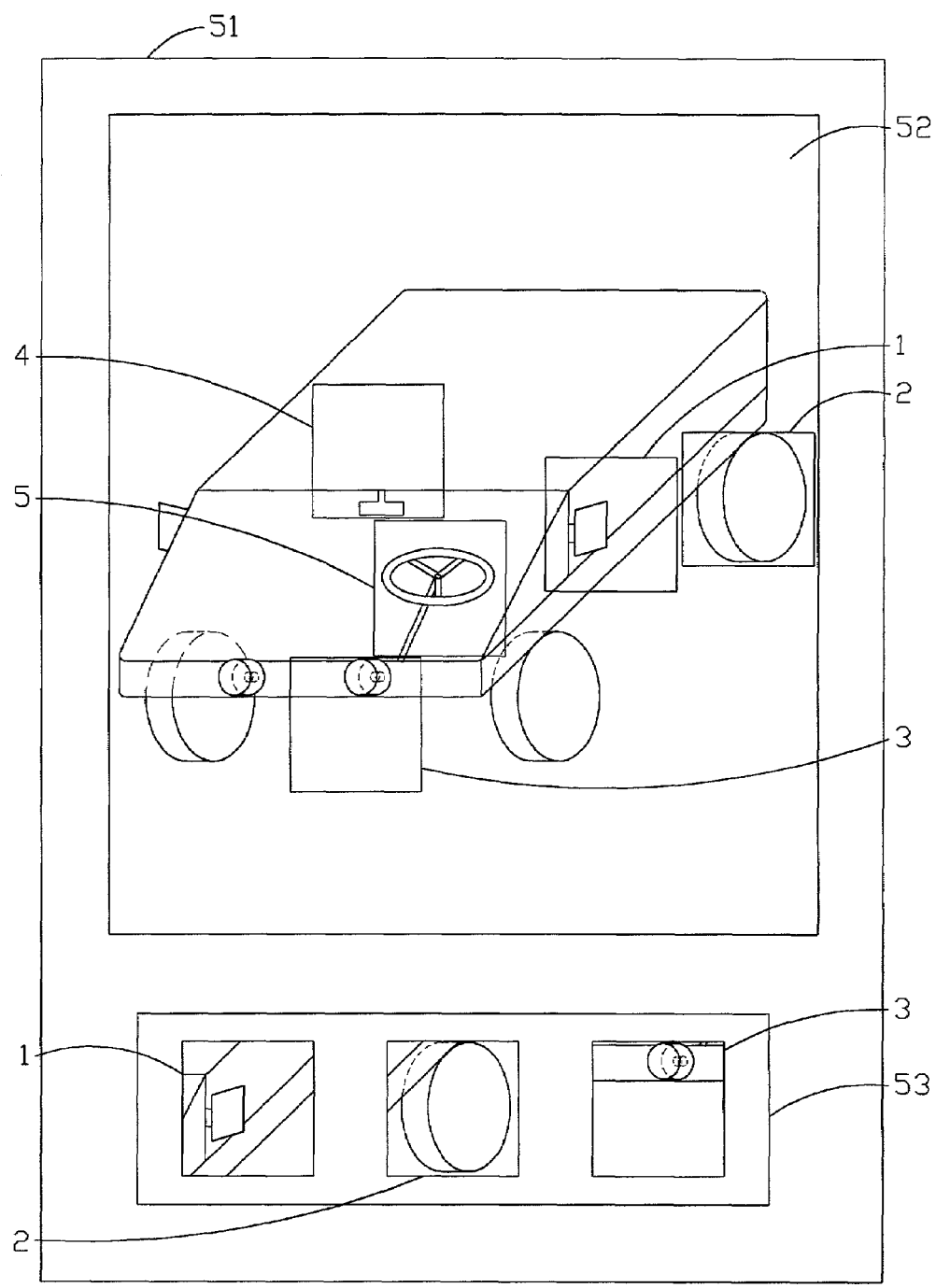
FIG. 4 is a schematic diagram illustrating to enlarge the dialog box in accordance with the present invention.

Shown in FIG. 4, in one embodiment, there are multitudes of various effects provided in the overview zone 52, such as job 1, job 2, job 3, job 4, and job 5, etc. When the users command the scanner to execute a scan of multitudes of selected jobs, the present invention stores the configuration of the scanned image and displays the selected job in the overview zone 53. Such as block 1 of fist selected job 1, block 2 of the second selected job 2, and block 3 of the third selected job 3. Users can also design any configuration in the setting scan zone and the setting image zone. The first functional button or the second functional button can choose a capturing job.

While this invention has been described with reference to illustrative embodiments, this description is not intended or to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method comprising:
   identifying a plurality of jobs selected from an overview zone of a display interface, wherein said overview zone comprises a preview image, and wherein said plurality of jobs are selected from different areas of said preview image;
   displaying one or more of said selected jobs on a preview zone of said display interface at a same time as said preview image is displayed on said overview zone, wherein said selected jobs comprise associated scan settings of a scanner;
   modifying said associated scan settings for at least one of said selected jobs such that said plurality of jobs includes a plurality of scan settings of said scanner; and scanning said at least one of said selected jobs with said scanner.

2. The method of claim 1, further comprising scanning said selected jobs with a single scan operation, wherein at least two of said selected jobs are scanned using different scan settings.

3. The method of claim 2, wherein said different scan settings comprise a capturing resolution.

4. The method of claim 1, wherein said different areas comprise different object images.

5. The method of claim 1, wherein said different areas comprise different size frames of said preview image.

6. The method of claim 2, wherein said different scan settings comprise a capturing job size.

7. The method of claim 1, further comprising scanning at least two of said plurality of selected jobs in a single scan.

8. The method of claim 7, wherein said at least two of said plurality of selected jobs are selected from a single preview scan comprised of said preview image.

9. The method of claim 1, wherein said plurality of selected jobs are sequentially displayed on said preview zone while said preview image is displayed on said overview zone.

10. A non-transitory computer-readable medium encoded with computer-executable instructions that, in response to being executed by a system, cause said system to perform operations comprising:
  scanning an image using a low resolution preview setting;
  displaying a plurality of jobs selected from said scanned image, wherein each of said plurality of jobs are selected from different regions of said scanned image and wherein one or more of said plurality of jobs is associated with a high resolution scan setting; and
  scanning said plurality of jobs, wherein said high resolution scan setting is a higher resolution than a scanning resolution used to scan said scanned image.

11. The non-transitory computer-readable medium of claim 10, wherein said operations further comprise scanning at least two of said plurality of jobs in a single scanning operation.

12. The non-transitory computer-readable medium of claim 10, wherein said operations further comprise identifying at least two of said plurality of jobs from a single scan of said scanned image.

13. The non-transitory computer-readable medium of claim 10, wherein said operations further comprise displaying said scanned image at a same time as said one or more of said plurality of jobs are displayed.

14. The non-transitory computer-readable medium of claim 10, wherein said operations further comprise generating a digital image comprised of said scanned plurality of jobs.

15. An apparatus comprising:
  an overview zone capable of displaying an image scanned at a low resolution setting; and
  a preview zone capable of displaying a plurality of imaging jobs selected from different image locations of said low resolution image, wherein said overview zone and said preview zone are further capable of displaying said low resolution image and at least one of said plurality of imaging jobs simultaneously.

16. The apparatus of claim 15, further comprising an image setting zone capable of providing one or more resolution settings for said plurality of imaging jobs, wherein said at least one of said plurality of imaging jobs is set to be scanned at a higher resolution than said low resolution image.

17. The apparatus of claim 15, further comprising a set module capable of changing scan settings for said plurality of imaging jobs, wherein each of said plurality of imaging jobs comprises a different scan setting.

18. The apparatus of claim 17, wherein said different scan setting comprises a different scanning resolution.

19. The apparatus of claim 15, wherein said preview zone is capable of sequentially displaying said plurality of imaging jobs.

20. A method, comprising:
  scanning an original with a low resolution scanning operation of a scanner to obtain a preview image of said original;
  displaying said preview image on an overview zone of a display device;
  identifying two or more imaging jobs selected from different areas of said preview image, wherein one or more of said imaging jobs are associated with a high resolution scan setting of said scanner, and wherein said two or more imaging jobs are displayed on a preview zone of said display device; and
  displaying said two or more imaging jobs on said preview zone at a same time as said preview image is displayed on said overview zone.

21. The method of claim 20, further comprising scanning said two or more imaging jobs, wherein said high resolution scan setting comprises a higher resolution than a resolution associated with said low resolution scanning operation.

22. The method of claim 21, wherein said two or more imaging jobs are scanned at different resolutions.

23. The method of claim 21, further comprising combining said two or more imaging jobs to create a higher resolution image of said preview image.

24. A non-transitory computer-readable medium encoded with computer-executable instructions that, in response to being executed by a system, cause said system to perform operations comprising:
  scanning a preview image using a first resolution scan setting;
  displaying said preview image;
  identifying a plurality of imaging jobs selected from said preview image;
  displaying at least one of said plurality of imaging jobs at a same time as said preview image is displayed; and
  scanning said at least one of said plurality of imaging jobs using a second resolution scan setting.

25. The non-transitory computer-readable medium of claim 24, wherein said operations further comprise identifying said second resolution scan setting for said at least one of said plurality of imaging jobs, and wherein said second resolution scan setting is higher than said first resolution scan setting.

26. The non-transitory computer-readable medium of claim 24, wherein said plurality of imaging jobs are selected from different regions of said preview image.

27. The non-transitory computer-readable medium of claim 24, wherein at least some of said plurality of imaging jobs are scanned at different resolutions from each other.

28. An apparatus comprising:
  an overview zone capable of displaying a preview image;
  a preview zone capable of sequentially displaying two or more imaging jobs selected from different regions of said preview image; and
  an image setting zone capable of selecting a scanning resolution for each of said two or more imaging jobs, wherein said scanning resolution is greater than or equal to a resolution of said preview image.

29. The apparatus of claim 28, wherein said image setting zone is further capable of selecting different scanning resolutions for each of said two or more imaging jobs.

30. A method, comprising:
- scanning a single image using a low resolution preview setting of a scanner;
- displaying said single scanned image on a display device;
- identifying a plurality of imaging jobs selected from said single scanned image;
- displaying one or more of said plurality of imaging jobs on said display device at a same time as said single scanned image is displayed; and
- scanning said one or more imaging jobs at a high resolution setting of said scanner, wherein said high resolution setting provides a greater scanning resolution than said low resolution preview setting.

31. The method of claim 30, further comprising identifying a different scan setting for two or more of said plurality of imaging jobs, wherein said two or more imaging jobs are scanned according to their respective scan setting.

32. The method of claim 31, wherein said different scan setting comprises a different scan resolution for each of said two or more imaging jobs.

33. The method of claim 30, wherein said one or more imaging jobs are selected from different scan regions from said single scanned image.

34. A non-transitory computer-readable medium encoded with computer-executable instructions that, in response to being executed by a system, cause said system to perform operations comprising:
- identifying a plurality of jobs selected from an overview zone including a preview image, wherein said plurality of jobs are selected from different areas of said preview image;
- displaying one or more of said selected jobs on a preview zone at a same time as said preview image is displayed on said overview zone, wherein said selected jobs are associated with scan settings; and
- modifying said associated scan settings for at least one of said selected jobs such that said plurality of jobs includes a plurality of scan settings.

35. The non-transitory computer-readable medium of claim 34, wherein said operations further comprise:
- scanning said preview image at a first resolution; and
- scanning one or more of said selected jobs at a second resolution, wherein said second resolution is greater than said first resolution.

36. The non-transitory computer-readable medium of claim 35, wherein said operations further comprise displaying one or more of said scanned jobs at said same time as said preview image is displayed.

37. The non-transitory computer-readable medium of claim 34, wherein displaying said one or more selected jobs comprises sequentially displaying said plurality of jobs.

38. The non-transitory computer-readable medium of claim 34, wherein displaying said one or more selected jobs comprises simultaneously displaying said plurality of jobs.

39. The non-transitory computer-readable medium of claim 34, wherein said operations further comprise displaying said preview image on a monitor, wherein said at least one of said selected jobs is displayed on said monitor simultaneously with said preview image.

40. The non-transitory computer-readable medium of claim 34, wherein said operations further comprise scanning said plurality of jobs at a higher resolution than said preview image.

41. The non-transitory computer-readable medium of claim 40, wherein said at least one of said selected jobs is scanned at a different resolution than another of said plurality of jobs.

42. An apparatus comprising:
- means for scanning an image using a low resolution preview setting;
- means for displaying a plurality of jobs selected from said scanned image, wherein each of said plurality of jobs is selected from different regions of said scanned image, and wherein one or more of said plurality of jobs is associated with a high resolution scan setting; and
- means for scanning said plurality of jobs, wherein said high resolution scan setting is a higher resolution than a scanning resolution used to scan said scanned image.

43. The apparatus of claim 42, wherein said means for scanning comprises means for scanning at least two of said plurality of imaging jobs approximately simultaneously.

44. The apparatus of claim 42, further comprising:
- means for identifying said plurality of jobs selected from an overview zone including said scanned image;
- means for displaying said one or more jobs on a preview zone at a same time as said scanned image is displayed on said overview zone, wherein said one or more jobs comprise associated scan settings; and
- means for modifying said associated scan settings for said one or more jobs such that said plurality of jobs includes a plurality of scan settings.

45. The apparatus of claim 44, further comprising:
- means for displaying said scanned image on said overview zone, wherein said plurality of jobs are sequentially displayed on said preview zone while said preview image is displayed on said overview zone.

46. The apparatus of claim 44, further comprising:
- means for displaying said scanned image on said overview zone, wherein two or more of said plurality of jobs are displayed on said preview zone at said same time as said scanned image is displayed on said overview zone.

* * * * *